United States Patent

Watson

[11] Patent Number: 6,021,745
[45] Date of Patent: Feb. 8, 2000

[54] FUEL LEAD ADDITIVE DEVICE

[76] Inventor: Daniel E. Watson, 36 Sutcliffe Road, London, England, United Kingdom, SE18 2NG

[21] Appl. No.: 09/133,443

[22] Filed: Aug. 13, 1998

[51] Int. Cl.[7] .................................................. F02M 27/02
[52] U.S. Cl. ........................................... 123/1 A; 123/538
[58] Field of Search ..................................... 123/1 A, 538

[56] References Cited

U.S. PATENT DOCUMENTS

| | | | |
|---|---|---|---|
| 3,816,083 | 6/1974 | Patterson | 48/59 |
| 5,074,273 | 12/1991 | Brown | 123/538 |
| 5,092,303 | 3/1992 | Brown | 123/538 |
| 5,507,942 | 4/1996 | Davis | 210/94 |
| 5,625,118 | 4/1997 | Finkl | 585/899 |
| 5,728,913 | 3/1998 | Finkl | 585/899 |

FOREIGN PATENT DOCUMENTS 1388573  4/1988  Russian Federation ............... 123/538

*Primary Examiner*—Tony M. Argenbright
*Assistant Examiner*—Brian Hairston

[57] ABSTRACT

A new fuel lead additive device for adding lead to fuel for combustion engines. The inventive device includes a housing having an interior, an inlet, and an outlet. The inlet of the housing is fluidly connectable to the fuel line such that fluid may pass from a fuel tank into the interior of the housing through the inlet of the housing. The outlet of the housing is fluidly connectable to the fuel line such that fluid may pass from the interior of the housing through the outlet of the housing to a combustion engine. A plurality of lead beads are provided in the interior of the housing so that fuel passing through the housing mix with the beads such that lead is added to the fuel.

8 Claims, 3 Drawing Sheets

FUEL LEAD ADDITIVE DEVICE

BACKGROUND OF THE INVENTION

1. Field of the Invention

The present invention relates to devices for adding lead to fuel and more particularly pertains to a new fuel lead additive device for adding lead to fuel for combustion engines.

2. Description of the Prior Art

The use of devices for adding lead to fuel is known in the prior art. More specifically, devices for adding lead to fuel heretofore devised and utilized are known to consist basically of familiar, expected and obvious structural configurations, notwithstanding the myriad of designs encompassed by the crowded prior art which have been developed for the fulfillment of countless objectives and requirements.

Known prior art devices for adding lead to fuel include U.S. Pat. No. 4,170,960; U.S. Pat. No. 4,418,654; U.S. Pat. No. 4,804,389; U.S. Pat. No. 2,958,317; U.S. Pat. No. 2,769,624; and U.S. Pat. No. 4,557,221.

While these devices fulfill their respective, particular objectives and requirements, the aforementioned patents do not disclose a new fuel lead additive device. The inventive device includes a housing having an interior, an inlet, and an outlet. The inlet of the housing is fluidly connectable to the fuel line such that fluid may pass from a fuel tank into the interior of the housing through the inlet of the housing. The outlet of the housing is fluidly connectable to the fuel line such that fluid may pass from the interior of the housing through the outlet of the housing to a combustion engine. A plurality of lead beads are provided in the interior of the housing so that fuel passing through the housing mix with the beads such that lead is added to the fuel.

In these respects, the fuel lead additive device according to the present invention substantially departs from the conventional concepts and designs of the prior art, and in so doing provides an apparatus primarily developed for the purpose of adding lead to fuel for combustion engines.

SUMMARY OF THE INVENTION

In view of the foregoing disadvantages inherent in the known types of devices for adding lead to fuel now present in the prior art, the present invention provides a new fuel lead additive device construction wherein the same can be utilized for adding lead to fuel for combustion engines.

The general purpose of the present invention, which will be described subsequently in greater detail, is to provide a new fuel lead additive device apparatus and method which has many of the advantages of the devices for adding lead to fuel mentioned heretofore and many novel features that result in a new fuel lead additive device which is not anticipated, rendered obvious, suggested, or even implied by any of the prior art devices for adding lead to fuel, either alone or in any combination thereof.

To attain this, the present invention generally comprises a housing having an interior, an inlet, and an outlet. The inlet of the housing is fluidly connectable to the fuel line such that fluid may pass from a fuel tank into the interior of the housing through the inlet of the housing. The outlet of the housing is fluidly connectable to the fuel line such that fluid may pass from the interior of the housing through the outlet of the housing to a combustion engine. A plurality of lead beads are provided in the interior of the housing so that fuel passing through the housing mix with the beads such that lead is added to the fuel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fuel lead additive device apparatus and method which has many of the advantages of the devices for adding lead to fuel mentioned heretofore and many novel features that result in a new fuel lead additive device which is not anticipated, rendered obvious, suggested, or even implied by any of the prior art devices for adding lead to fuel, either alone or in any combination thereof.

It is another object of the present invention to provide a new fuel lead additive device which may be easily and efficiently manufactured and marketed.

It is a further object of the present invention to provide a new fuel lead additive device which is of a durable and reliable construction.

An even further object of the present invention is to provide a new fuel lead additive device which is susceptible of a low cost of manufacture with regard to both materials and labor, and which accordingly is then susceptible of low prices of sale to the consuming public, thereby making such fuel lead additive device economically available to the buying public.

Still yet another object of the present invention is to provide a new fuel lead additive device which provides in the apparatuses and methods of the prior art some of the advantages thereof, while simultaneously overcoming some of the disadvantages normally associated therewith.

Still another object of the present invention is to provide a new fuel lead additive device for adding lead to fuel for combustion engines.

Yet another object of the present invention is to provide a new fuel lead additive device which includes a housing having an interior, an inlet, and an outlet. The inlet of the housing is fluidly connectable to the fuel line such that fluid may pass from a fuel tank into the interior of the housing through the inlet of the housing. The outlet of the housing is fluidly connectable to the fuel line such that fluid may pass from the interior of the housing through the outlet of the housing to a combustion engine. A plurality of lead beads are provided in the interior of the housing so that fuel passing through the housing mix with the beads such that lead is added to the fuel.

Still yet another object of the present invention is to provide a new fuel lead additive device that provides lead for combustion engines needed a lead additive in the fuel they use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
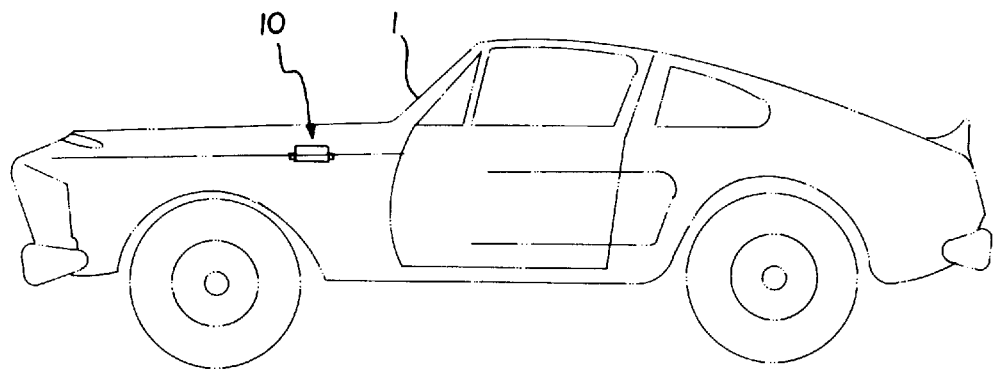
FIG. 1 is a schematic side view of an ideal positioning of a new fuel lead additive device in a vehicle according to the present invention.
Figure 2:
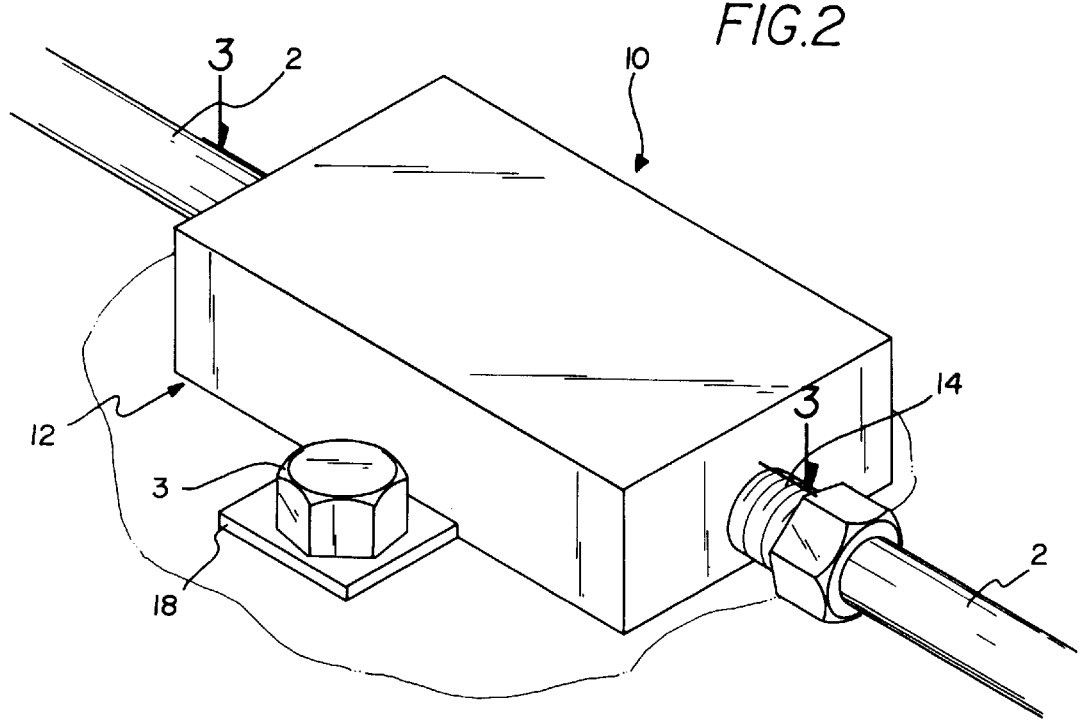
FIG. 2 is a schematic perspective view of the exterior of the present invention.

With reference now to the drawings, and in particular to FIGS. 1 through 5 thereof, a new fuel lead additive device embodying the principles and concepts of the present invention and generally designated by the reference numeral 10 will be described.

As best illustrated in FIGS. 1 through 5, the fuel lead additive device 10 generally comprises a housing 12 having an interior 13, an inlet 14, and an outlet 15. The inlet 14 of the housing 12 is fluidly connectable to the fuel line 2 such that fluid may pass from a fuel tank into the interior 13 of the housing 12 through the inlet 14 of the housing 12. The outlet 15 of the housing 12 is fluidly connectable to the fuel line 2 such that fluid may pass from the interior 13 of the housing 12 through the outlet 15 of the housing 12 to a combustion engine. A plurality of lead beads 20 are provided in the interior 13 of the housing 12 so that fuel passing through the housing 12 mix with the beads 20 such that lead is added to the fuel.

In use, the device 10 is designed for adding lead to fuel to a fuel line 2 of a vehicle 1 fluidly connecting a fuel tank to a combustion engine. The device 10 is fluidly connectable to the fuel line 2 between the fuel tank and the combustion engine. In closer detail, the housing 12 has an interior 13, an inlet 14, and an outlet 15. As illustrated, the housing 12 is rectangular, that is box shaped, however, it should be understood that the housing may be any appropriate shape including cylindrical. Ideally, the housing 12 has a length of less than about 4 inches and a width or diameter of less than about 2 inches. The housing 12 is designed for attachment to a vehicle 1, in particular, to the engine compartment 23 of a vehicle 1 as illustrated in FIG. 1. Preferably, the housing 12 has a mounting tab 18 with a mounting hole 19 for mounting the housing 12 to a vehicle 1 by means of a fastener 3.

Figure 3:
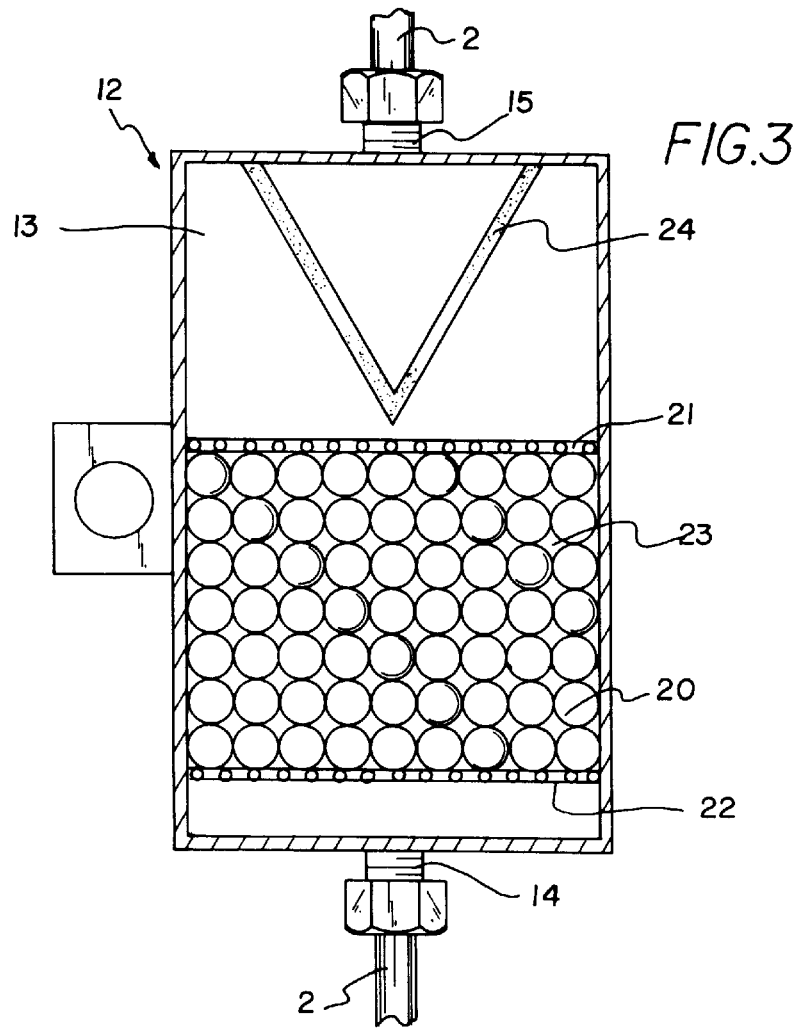
FIG. 3 is a schematic cross sectional view of the present invention taken from line 3—3 on FIG. 2.
Figure 4:
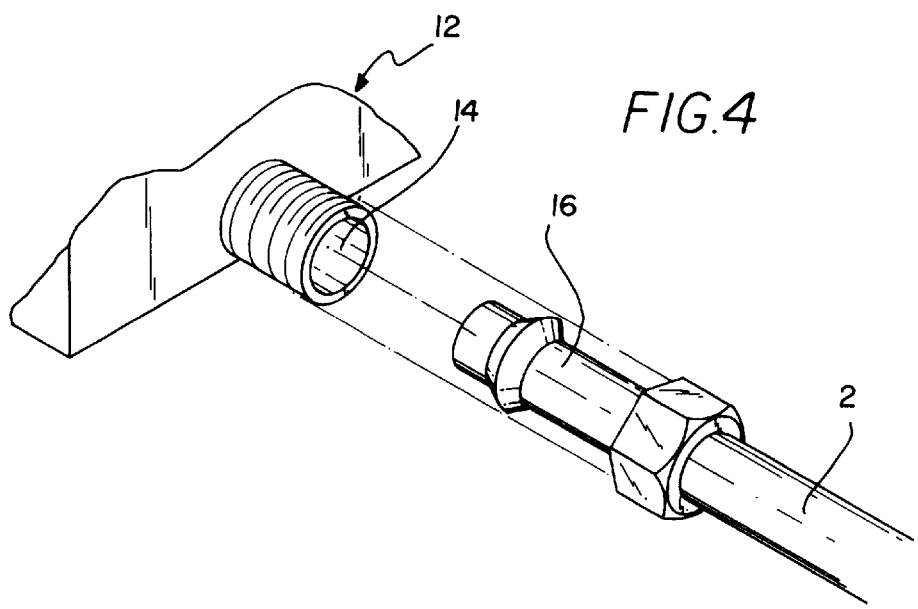
FIG. 4 is a schematic partial perspective view of the present invention with a compression fitting.
Figure 5:
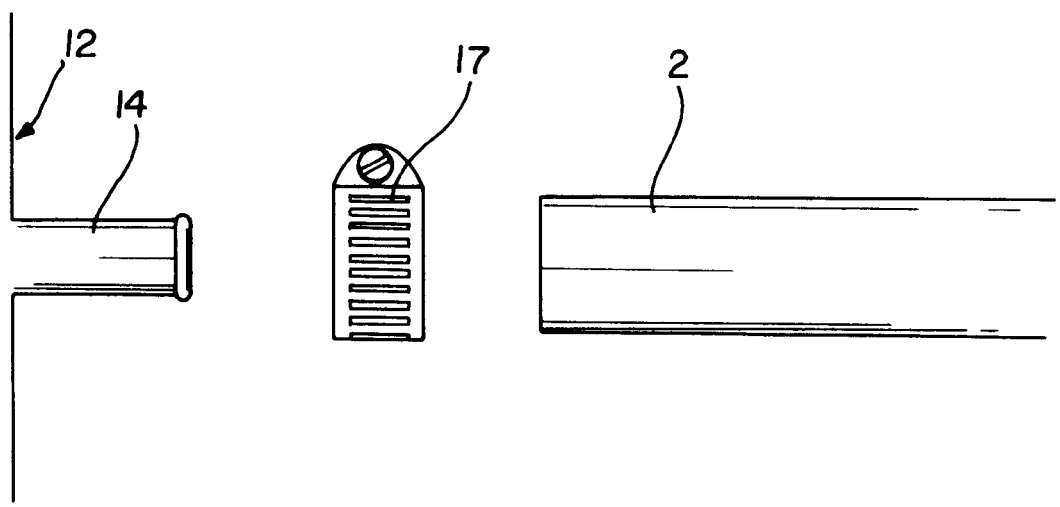
FIG. 5 is a schematic partial side view of the present invention with a hose clamp fitting.

With reference to FIG. 3, the inlet 14 of the housing 12 is fluidly connectable to the fuel line 2 such that fluid may pass from a fuel tank into the interior 13 of the housing 12 through the inlet 14 of the housing 12. The outlet 15 of the housing 12 is fluidly connectable to the fuel line 2 such that fluid may pass from the interior 13 of the housing 12 through the outlet 15 of the housing 12 to a combustion engine. In one ideal embodiment as illustrated in FIG. 4, a compression fitting 16 attaches the fuel line 2 to the inlet 14 and outlet 15 of the housing 12. In another ideal embodiment as illustrated in FIG. 5, a hose clamp 17 attaches the fuel line 2 to the inlet 14 and outlet 15 of the housing 12.

With reference again to FIG. 3, a plurality of beads 20 are provided in the interior 13 of the housing 12. The beads 20 comprise lead and are ideally generally spherical in shaped with a diameter between ½ inch and 1/16 inch. The beads 20 are designed for adding lead into fuel passing into the interior 13 of the housing 12. In use, the vibrations of the combustion engine and movement of the vehicle 1 help to mix the fuel in the housing 12 with the beads so that lead is included in the fuel. A pair spaced apart of screens 21,22 are located in the interior 13 of the housing 12 to define a compartment 23 therebetween such that fluid passing through the interior 13 of the housing 12 from the inlet 14 of the housing 12 to the outlet 15 of the housing 12 passes through the compartment 23. The beads 20 are located in the compartment 23. The screens 21,22 each have a plurality of apertures with the size of each of the apertures being smaller than the size of a bead to prevent passage of the beads 20 through the screens 21,22 (yet large enough to permit fluid to pass therethrough).

A filter 24 is provided in the interior 13 of the housing 12. The filter 24 is positioned between the compartment 23 and the outlet 15 of the housing 12 such that fluid passing from the interior 13 of the housing 12 through the outlet 15 into the fuel line 2 passes through the filter 24. The filter 24 blocks passage of particles of a predetermined size therethrough. The filter 24 is designed for preventing large particles and debris in the fuel from passing through into the combustion engine where they may clog up a carburetor. In use, ideally, engine vibrations and gravity help keep the filter 24 clean and unclogged with debris. It should also be noted that the screens 21,22 are also designed for preventing the beads 20 from hitting and damaging the filter 24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for adding lead to fuel to a fuel line fluidly connecting a fuel tank to a combustion engine, said device being fluidly connectable to the fuel line between the fuel tank and the combustion engine, said device comprising;

a housing having an interior, an inlet, and an outlet;

said inlet of said housing being fluidly connectable to said fuel line such that fluid may pass from a fuel tank into said interior of said housing through said inlet of said housing;

said outlet of said housing being fluidly connectable to said fuel line such that fluid may pass from said interior of said housing through said outlet of said housing to a combustion engine;

a plurality of beads being provided in said interior of said housing, and a pair of spaced apart screens being located in said interior of said housing, said screens defining a compartment therebetween such that fluid passing through said interior of said housing from said inlet of said housing to said outlet of said housing passes through said compartment, said beads being located in said compartment, said compartment having an area less than half an area of said interior of said housing such that fluid passing through said compartment is mixed in said interior space of said housing not containing said compartment.

2. The device of claim 1, wherein said housing is adapted for attachment to a vehicle.

3. The device of claim 2, wherein said housing has a mounting tab being adapted for mounting said housing to a vehicle.

4. The device of claim 1, wherein said beads comprise lead.

5. The device of claim 4, wherein said beads are generally spherical and have a diameter between ½ inch and 1/16 inch.

6. The device of claim 1, further comprising a filter being provided in said interior space of said housing, said filter blocking passage of particles of a predetermined size therethrough, said filter being positioned between said compartment and said outlet of said housing such that fluid passing from said interior of said housing through said outlet into the fuel line passes through said filter.

7. The device of claim 1, further comprising a filter being provided in said interior space of said housing, said filter blocking passage of particles of a predetermined size therethrough.

8. A device for adding lead to fuel to a fuel line of a vehicle fluidly connecting a fuel tank to a combustion engine, said device being fluidly connectable to the fuel line between the fuel tank and the combustion engine, said device comprising:

a housing having an interior, an inlet, and an outlet;

said housing being adapted for attachment to a vehicle, said housing having a mounting tab being adapted for mounting said housing to a vehicle;

said inlet of said housing being fluidly connectable to said fuel line such that fluid may pass from a fuel tank into said interior of said housing through said inlet of said housing;

said outlet of said housing being fluidly connectable to said fuel line such that fluid may pass from said interior of said housing through said outlet of said housing to a combustion engine;

a plurality of beads being provided in said interior of said housing, wherein said beads comprise lead, wherein said beads are generally spherical and has a diameter between ½ inch and 1/16 inch;

a pair of spaced apart screens being located in said interior of said housing, said screens defining a compartment therebetween such that fluid passing through said interior of said housing from said inlet of said housing to said outlet of said housing passes through said compartment, said compartment having an area less than half an area of said interior of said housing such that fluid passing through said compartment is mixed in said interior space of said housing not containing said compartment;

said beads being located in said compartment; and a filter being provided in said interior space of said housing, said filter blocking passage of particles of a predetermined size therethrough, said filter being positioned between said compartment and said outlet of said housing such that fluid passing from said interior of said housing through said outlet into the fuel line passes through said filter.

* * * * *